US007978786B2

(12) United States Patent
Song

(10) Patent No.: US 7,978,786 B2
(45) Date of Patent: Jul. 12, 2011

(54) APPARATUS AND METHOD FOR QUANTIZATION IN DIGITAL COMMUNICATION SYSTEM

(75) Inventor: Tae-Ik Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1111 days.

(21) Appl. No.: 11/729,482

(22) Filed: Mar. 29, 2007

(65) Prior Publication Data

US 2007/0233474 A1 Oct. 4, 2007

(30) Foreign Application Priority Data

Mar. 30, 2006 (KR) ........................ 10-2006-0028920

(51) Int. Cl.
*H04L 27/06* (2006.01)
*H04L 27/14* (2006.01)

(52) U.S. Cl. ........................................ 375/316; 375/340

(58) Field of Classification Search .................. 375/240, 375/240.01, 240.02, 240.03, 262, 265, 316, 375/340–341, 377; 714/759, 792, 794, 795; 348/27, 405, 419; 370/230, 230.1, 252, 477
See application file for complete search history.

(56) References Cited

U.S. PATENT DOCUMENTS

| | | | | |
|---|---|---|---|---|
| 5,301,205 | A * | 4/1994 | Tsutsui et al. | 375/340 |
| 6,748,032 | B1 * | 6/2004 | Kim et al. | 375/340 |
| 6,885,711 | B2 * | 4/2005 | Shiu et al. | 375/340 |
| 7,149,262 | B1 * | 12/2006 | Nayar et al. | 375/341 |
| 7,471,223 | B2 * | 12/2008 | Lee | 341/131 |
| 7,555,067 | B2 * | 6/2009 | Jeong | 375/340 |
| 7,616,699 | B2 | 11/2009 | Niu et al. | |
| 2003/0007577 | A1 * | 1/2003 | Shiu et al. | 375/341 |
| 2003/0091129 | A1 * | 5/2003 | Zhang et al. | 375/340 |
| 2004/0048589 | A1 | 3/2004 | Yamamoto et al. | |
| 2004/0170290 | A1 * | 9/2004 | Chang et al. | 381/94.2 |
| 2005/0025076 | A1 * | 2/2005 | Chaudhuri et al. | 370/310 |
| 2005/0037712 | A1 | 2/2005 | Rainbolt et al. | |
| 2007/0086541 | A1 * | 4/2007 | Moon et al. | 375/267 |

FOREIGN PATENT DOCUMENTS

| | | |
|---|---|---|
| JP | 7-087031 | 3/1995 |
| JP | 08-167863 | 6/1996 |
| JP | 10-093965 | 4/1998 |
| JP | 10-136361 | 5/1998 |
| JP | 2000-022671 | 1/2000 |
| JP | 2001-501045 | 1/2001 |

(Continued)

OTHER PUBLICATIONS

3rd Generation Partnership Project; Technical Specification Group Radio Access Network; Physical Layer Aspects of UTRA High Speed.

(Continued)

*Primary Examiner* — Tesfaldet Bocure
*Assistant Examiner* — Lawrence B Williams
(74) *Attorney, Agent, or Firm* — The Farrell Law Firim, P.C.

(57) ABSTRACT

Disclosed is an apparatus and a method for actively adjusting the quantization interval of signals inputted to a decoder in a digital communication system. The apparatus includes a quantization level generator for measuring a dynamic range of received packet data and calculating a corresponding scale factor, and an input signal converter for scaling a received data signal according to the scale factor so as to output a quantized signal.

20 Claims, 7 Drawing Sheets

FOREIGN PATENT DOCUMENTS

| | | |
|---|---|---|
| JP | 2003-195896 | 7/2003 |
| JP | 2003-332973 | 11/2003 |
| KR | 1020050061239 | 6/2005 |
| KR | 1020060108197 | 10/2006 |
| WO | WO 97/31429 | 8/1997 |
| WO | WO 2005/076613 | 8/2005 |

OTHER PUBLICATIONS

Downlink Packet Access, (Release 2000), 3G TR25.848, V0.6.0, May 2000.

* cited by examiner

APPARATUS AND METHOD FOR QUANTIZATION IN DIGITAL COMMUNICATION SYSTEM

PRIORITY

This application claims priority to application entitled "Apparatus and Method for Quantization in Digital Communication System" filed with the Korean Intellectual Property Office on Mar. 30, 2006 and assigned Serial No. 2006-28920, the contents of which are incorporated herein by reference.

BACKGROUND OF THE INVENTION

1. Field of the Invention

The present invention relates to a modem chip for a digital communication system, and more particularly to an apparatus and a method for actively adjusting the quantization interval of signals inputted to a decoder in a digital communication system.

2. Description of the Related Art

As generally known in the art, conventional digital communication systems, particularly CDMA-type digital communication systems based on IS-2000, support voice services alone. However, the rapid development of mobile communication service technology and increasing user demand require that they also support data services in addition to voice services.

For example, an HDR (High Data Rate) mobile communication system is adapted to solely support a high-rate data service.

The receiver of mobile communication systems demodulates multi-path signals, which are received via different paths, and combines the modulated signals. The receiver includes at least two fingers for separately receiving RF (Radio Frequency) signals. The receiver allocates the multi-path signals, which have different time delays after going through different paths, to respective fingers, which then estimates the channel gain and phase, demodulates RF signals, and creates traffic symbols. The created traffic symbols are combined to improve the signal-receiving quality based on a time diversity effect.

FIG. 1 is a block diagram showing a conventional receiver. For clarity, only components related to decoder input are shown in the drawing.

Signals are received via an antenna and are mixed with carrier frequencies. Then, the signals undergo down-conversion, pass through an ADC (Analog-to-Digital Converter), which is not shown in the drawings, and are input to a rake receiver of a digital baseband stage. The rake receiver of the digital baseband stage includes a number of fingers 110 and 120 and a combiner 130. Each finger 110 and 120 receives data from a PN sequence generator (not shown) and despreads the data so that it has the same PN sequence as used by the base station. A Walsh sequence generator (not shown) multiplies the resulting data by a Walsh sequence, which corresponds to a channel to be demodulated. An accumulator (not shown) accumulates the resulting sequence as much as the symbol length so as to conduct Walsh discovering. At the same time, a channel estimator (not shown) estimates the current channel condition by using a pilot channel. A conjugation unit (not shown) obtains a conjugate from the channel estimation value. Multipliers 111 and 121 conduct complex multiplication with regard to the accumulated symbols as channel compensation. The demodulated symbols are output to the combiner 130, which combines the output from each finger and outputs it to the decoder stage.

The dynamic range of signals input to the decoder greatly varies depending on the signal modulation type, the wireless channel environment, and the number of times the packet codeword is repeated. Considering these varying factors, the dynamic range of decoder input is conventionally set to be large enough to accommodate the entire dynamic range of signals input to the decoder, when the receiver of the terminal modem is designed. Therefore, the conventional quantizer 140 must consider all of the modulation type, the amount of change of the wireless channel environment, and the maximum number of times the packet codeword is repeated, i.e. the worst case, when determining the dynamic range of signals input to the decoder. In addition, the quantizer 140 determines the quantization interval based on the number of effective bits used by the decoder. However, the quantizer 140 has a problem in that, since the quantization interval is determined solely against the worst case, the quantization cannot be optimized in a normal case (i.e. when the case is not the worst case). This lowers the signal-receiving performance of the decoder and degrades the decoder performance.

SUMMARY OF THE INVENTION

Accordingly, the present invention has been made to solve the above-mentioned problems occurring in the prior art, and it is an aspect of the present invention to provide an apparatus and a method for optimizing quantization by measuring the signal range of demodulated data and actively adjusting the quantization interval based on the measurement.

It is another aspect of the present invention to provide an apparatus and a method for quantizing decoder input signals optimally and actively according to the demodulation type, the number of times a packet codeword is repeated, and the varying wireless channel.

Furthermore, it is another aspect of the present invention to provide an apparatus and a method for improving the performance of a receiver without increasing the number of effective bits input to a decoder.

It is a further aspect of the present invention is to provide an apparatus and a method for improving the signal-receiving performance of a decoder without modifying the decoder.

It is a still further aspect of the present invention is to provide an apparatus and a method for actively adjusting the dynamic range of signals input to a decoder without modifying the decoder.

In order to accomplish these aspects of the present invention, there is provided an apparatus for adjusting a dynamic range of a decoder input signal in a digital communication system, the apparatus including a quantization level generator for measuring a dynamic range of received packet data and calculating a corresponding scale factor; and an input signal converter for scaling a received data signal according to the scale factor so as to output a quantized signal.

In accordance with another aspect of the present invention, there is provided a method for adjusting a dynamic range of a decoder input signal in a digital communication system, the method including creating a quantization level by measuring a dynamic range of received packet data and calculating a corresponding scale factor; and converting an input signal by scaling a received data signal according to the scale factor by creating a quantized signal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein is omitted to avoid making the subject matter of the present invention unclear. In addition, it is to be noted that terminologies used in the following description must be interpreted with regard to the overall context of the present invention, not varying intentions or practices of specific users or operators.

The present invention is directed to guaranteeing optimum performance of a modem chip receiver in a digital communication system by actively adjusting and optimally quantizing the dynamic range of inputs to the decoder.

It will be assumed in the following description of the present invention that HRPD (High Rate Packet Data) channels based on an IS-2000 1xEV (Evolution)-DO system, which is a synchronous CDMA communication schemes, are employed. However, those skilled in the art can easily understand that the present invention is also applicable to other types of communication systems having similar technological background and channel type without departing from the scope of the present invention.

Figure 2:
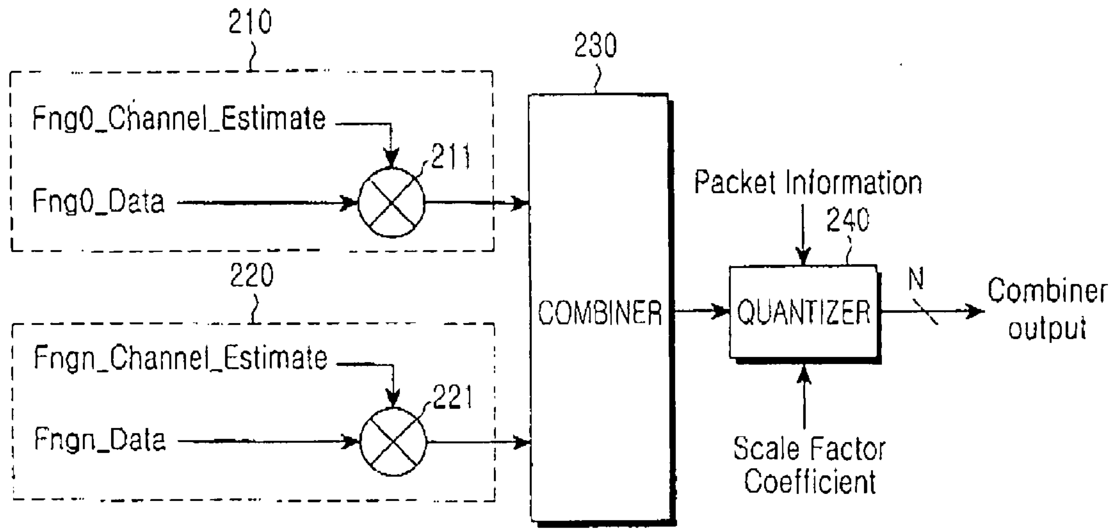
FIG. 2 is a block diagram showing the construction of a receiver in a digital communication system to which the present invention is applied.

FIG. 2 is a block diagram showing the construction of a receiver in a digital communication system to which the present invention is applied. For clarity, only components related to decoder input signals will be described.

Signals are received via an antenna and are mixed with carrier frequencies. Then, the signals undergo down-conversion, pass through an ADC (Analog-to-Digital Converter), which is not shown in the drawings, and are input to a receiver of a digital baseband stage. The receiver of the digital baseband stage includes a number of fingers 210 and 220, a combiner 230, and a dynamic quantizer 240.

Figure 1:
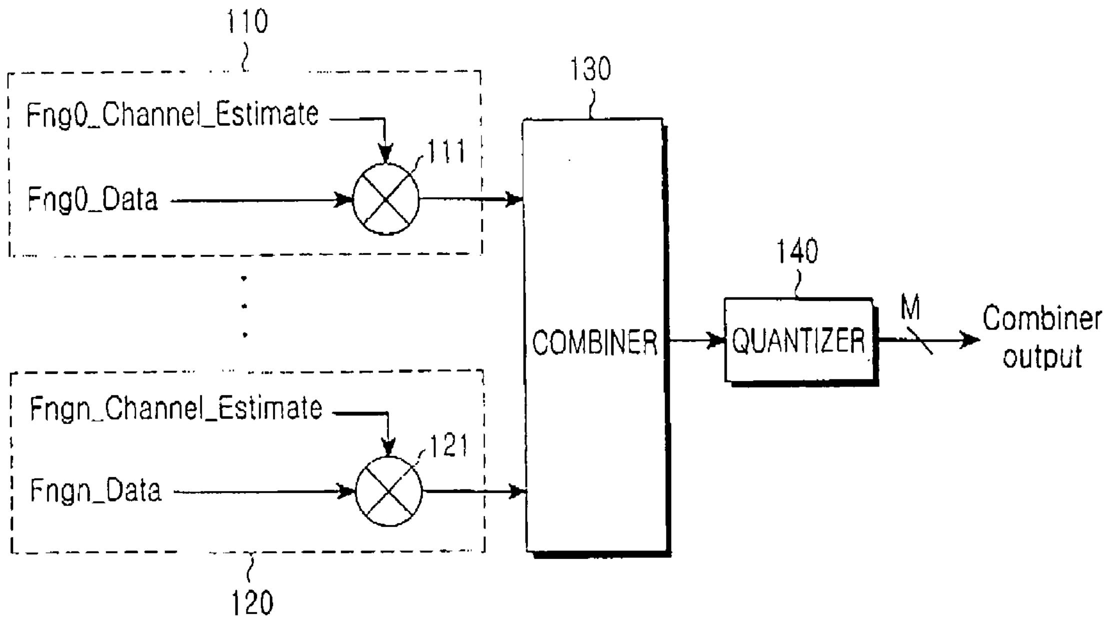
FIG. 1 (PRIOR ART)
FIG. 1 is a block diagram showing the construction of a conventional receiver.

The fingers 210 and 220 and the combiner 230 have the same construction as the fingers 110 and 120 and the combiner 130 described with reference to FIG. 1. However, the dynamic quantizer 240 is different from the quantizer 140 described with reference to FIG. 1.

The dynamic quantizer 240 according to the present invention measures signals, which have been input by the combiner 230, packet by packet and calculates the quantization level, i.e. the dynamic range of signals input to the decoder. Based on the calculated quantization level, the dynamic quantizer 240 quantizes received signals.

According to another embodiment of the present invention, the dynamic quantizer 240 calculates the quantization level from signals output by the combiner 230 with reference to a ROM (Read Only Memory) table, which has been prepared based on the number of times a packet is repeated and the scale factor, and quantizes received signals based on the calculated quantization level.

In order to optimally calculate the quantization level in this manner, packet information and a scale factor coefficient are input to the dynamic quantizer 240.

Figure 3:
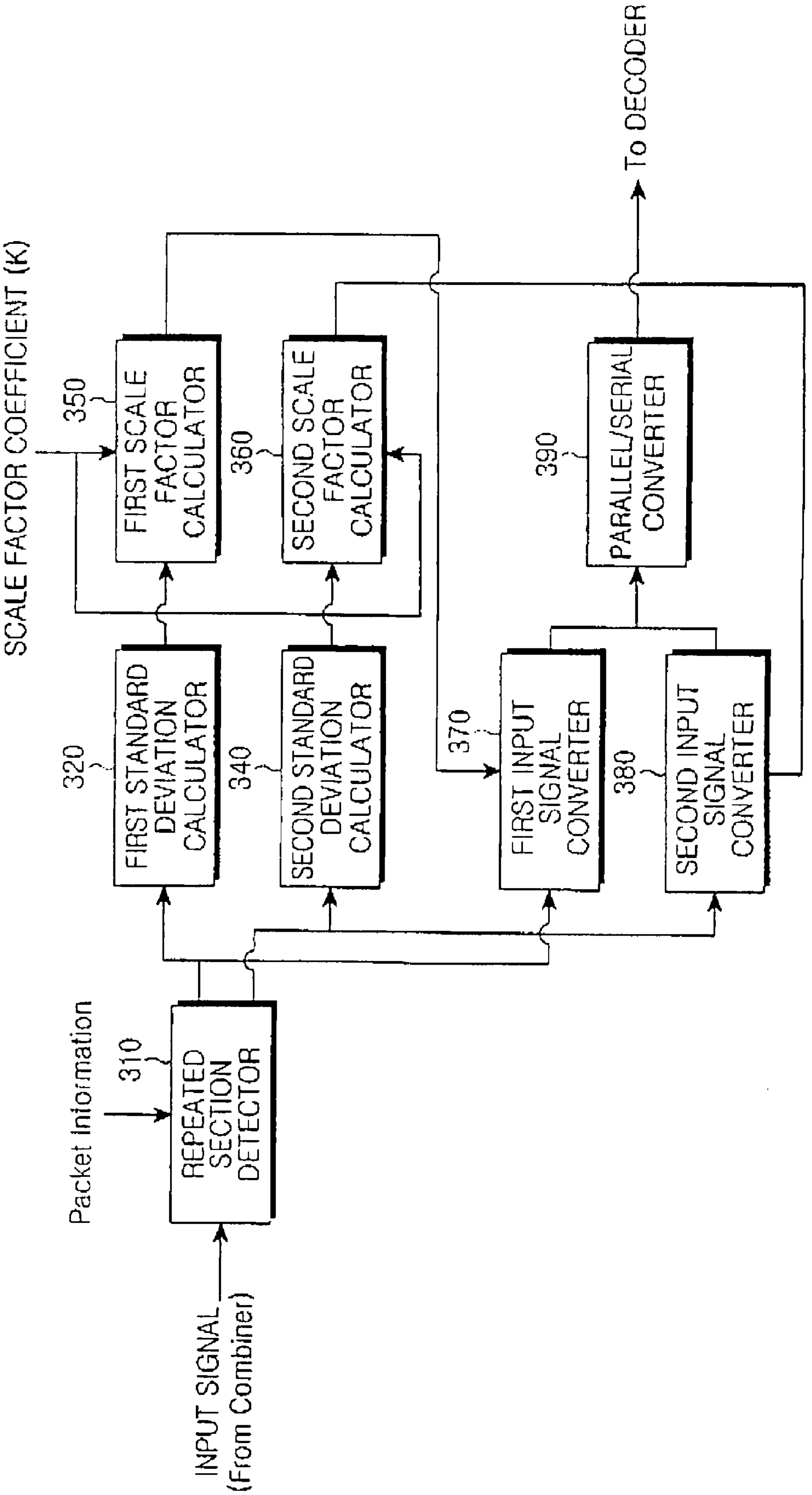
FIG. 3 shows a dynamic quantizer according to an embodiment of the present invention.
Figure 4:
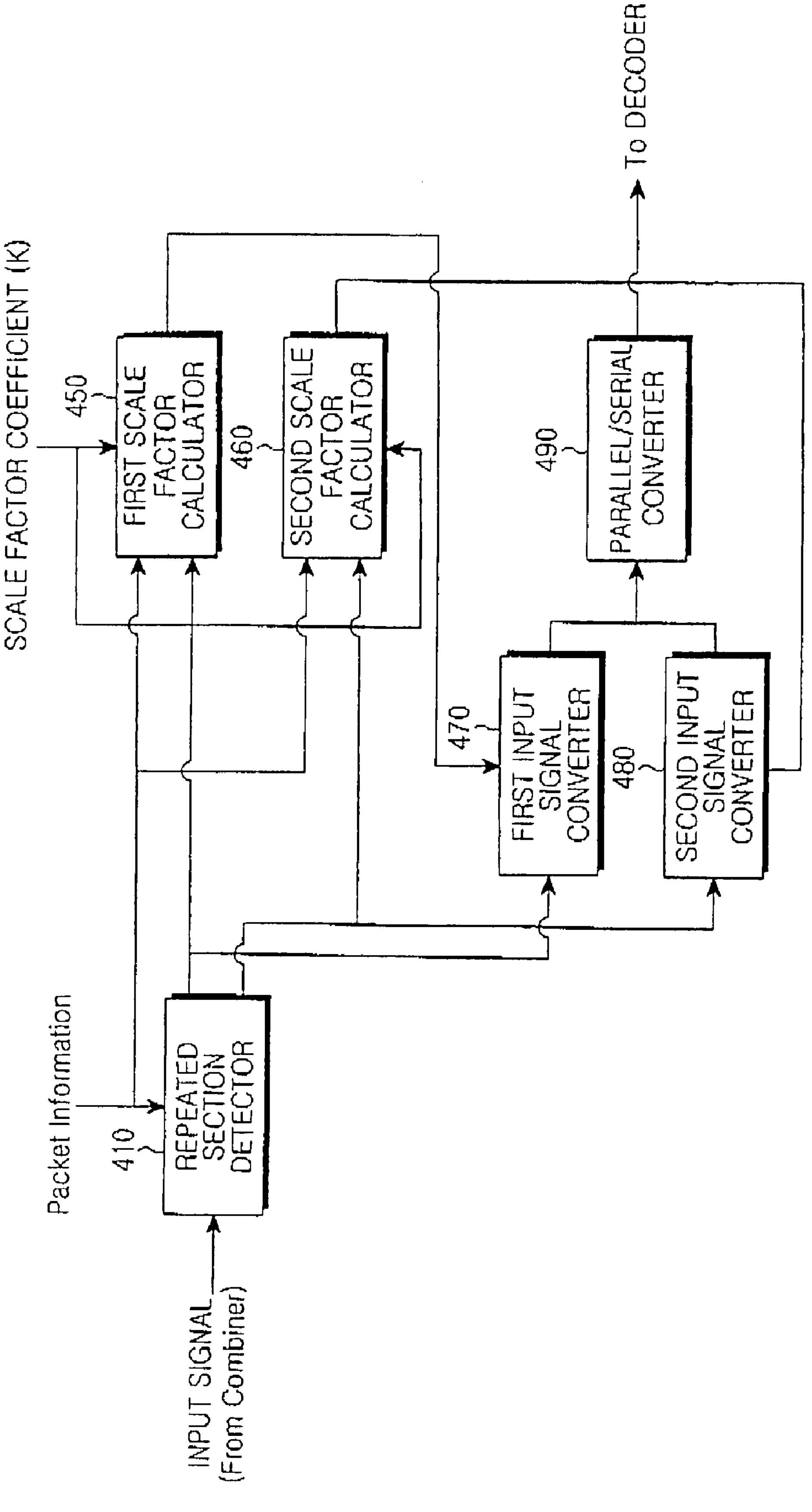
FIG. 4 shows a dynamic quantizer according to another embodiment of the present invention.

The dynamic quantizer 240 has a construction as shown in FIGS. 3 and 4. FIG. 3 shows a dynamic quantizer according to an embodiment of the present invention.

Referring to FIG. 3, the dynamic quantizer 240 includes a repeated section detector 310, standard deviation calculators 320 and 340, scale factor calculators 350 and 360, input signal converters 370 and 380, and a parallel/serial converter 390.

Although not shown in the drawings, the repeated section detector 310, the standard deviation calculators 320 and 340, the scale factor calculators 350 and 360 constitute a quantization level generator for measuring the dynamic range of received packet data and calculating a corresponding scale factor. The input signal converters 370 and 380 and the parallel/serial converter 390 constitute an input signal converter for scaling received data signals according to the scale factor and outputting quantized signals.

The repeated section detector 310 receives signals from the combiner 230 shown in FIG. 2 and detects first and second repeated sections based on the number of times a packet codeword is repeated If the number of times a packet codeword is repeated is n (where n is a positive integer) in the first repeated section, the same number is $n-1$ in the second repeated section. The repeated section detector 310 detects data in the first repeated section and outputs it to the first standard deviation calculator 320 and the first input signal converter 370. In addition, the repeated section detector 310 detects data in the second repeated section and outputs it to the second standard deviation calculator 340 and the second input signal converter 380. In this case, packet information is input to the repeated section detector 310.

The packet information includes the total number of transmitted slots for a packet, the number of codewords, and the modulation order. Based on the packet information, the repeated section detector 310 can grasp the packet configuration of transmitted slots and differentiate between first and second repeated sections, as will be described below in more detail.

The repeated section detector 310 of a terminal receiver in an HRPD system can detect a section having a codeword repeated a different number of times from received packets with reference to the DRC (Data Rate Control) value and the number of received slots.

The first standard deviation calculator 320 calculates the standard deviation of data in the first repeated section, which has been received from the repeated section detector 310, and measures the dynamic range of received packet signals.

The first standard deviation calculator 320 obtains the distribution with regard to the first repeated section and calculates the standard deviation. It is assumed that received signals follow normal distribution. A method for calculating the standard deviation will be described later in more detail with reference to FIG. 7.

The second standard deviation calculator 340 calculates the standard deviation of data in the second repeated section, which has been received from the repeated section detector 310, and measures the dynamic range of received packet signals.

In addition, the second standard deviation calculator 340 obtains the distribution with regard to the second repeated section and calculates the standard deviation. It is also assumed that received signals follow normal distribution.

It is to be noted that, since much overhead occurs in the receiver when calculating the standard deviation for every received slot, the standard deviation can not only be calculated with regard to all received packets, but also be calculated with regard to a limited section and be applied to all packets.

The first scale factor calculator 350 multiplies the standard deviation, which has been outputted by the first standard deviation calculator 320, with an input scale factor coefficient, and divides the product by $2^{effective\ bit\ number}$ so as to calculate a scale factor, which is then output to the first input signal converter 370.

The second scale factor calculator 360 multiplies the standard deviation, which has been output by the second standard deviation calculator 340, with an input scale factor, and divides the product by $2^{effective\ bit\ number}$ so as to calculate a scale factor, which is output to the second input signal converter 380.

It is generally known in the art that, in the case of normal distribution, K*standard deviation includes 99% of received signals if K=2.58. Such a parameter K, with which the standard deviation is multiplied, is referred to as a scale factor coefficient according to the present invention, and its value can be selected by the receiver designer as desired.

The first input signal converter 370 conducts scaling with regard to the first repeated section based on the scale factor value calculated by the first scale factor calculator 350. After this process, the level of received signals becomes constant in the first received section.

The first input signal converter 370 applies the scale factor value, which has been output by the first scale factor calculator 350, to a value newly output by the repeated section detector 310 so that the standard deviation is measured with regard to a limited section of received signals and then applied to all received signals.

The second input signal converter 380 conducts scaling with regard to the second repeated section based on the scale factor value calculated by the second scale factor calculator 360. After this process, the level of received signals becomes constant in the second received section.

The second input signal converter 380 applies the scale factor value, which has been output by the second scale factor calculator 360, to a value newly output by the repeated section detector 310 so that the standard deviation is measured with regard to a limited section of received signals and then applied to all received signals.

The parallel/serial converter 390 aligns the scaled signals, which have been output by the first and second input signal converters 370 and 380, into a sequence and transmits it to the decoder.

FIG. 4 shows a dynamic quantizer according to another embodiment of the present invention.

Referring to FIG. 4, the dynamic quantizer includes a repeated section detector 410, scale factor calculators 450 and 460, input signal converters 470 and 480, and a parallel/serial converter 490. The dynamic quantizer 240 according to this embodiment of the present invention is characterized in that it does not have the standard deviation calculators 320 and 340 shown in FIG. 3. Instead, this dynamic quantizer 240 conducts calculation, which is necessary to measure the standard deviation, in advance and stores it as a ROM table (not shown) for later use. The ROM table must enumerate the value of scale factor coefficient K and the scale factor value in relation to the number of times a packet codeword is repeated.

The repeated section detector 410 receives signals from the combiner 230 and detects first and second repeated sections based on the number of times a packet codeword is repeated. The repeated section detector 410 detects data in the first repeated section and outputs it to the first scale factor calculator 450 and the first input signal converter 470. In addition, the repeated section detector 410 detects data in the second repeated section and outputs it to the second scale factor calculator 460 and the second input signal converter 480. In this case, packet information is input to the repeated section detector 410 and the scale factor calculators 450 and 460.

The repeated section detector 410 of a terminal receiver in an HRPD system can detect a section in which a codeword is repeated n times and another section in which a codeword is repeated n−1 times from received packets with reference to the DRC (Data Rate Control) value and the number of received slots.

The first scale factor calculator 450 receives an input of packet information and scale factor K, calculates a scale factor value with reference to a standard deviation value stored in the ROM table, and outputs the calculated value.

The second scale factor calculator 460 receives an input of packet information and scale factor K, calculates a scale factor value with reference to a standard deviation value stored in the ROM table, and outputs the calculated value.

The first and second scale factor calculators 450 and 460 must calculate respective scale factors for two sections and, to this end, they must know the number of repetitions included in the packet information. This is because the scale factor depends on the number of repetitions.

The first input signal converter 470 conducts scaling with regard to the first repeated section based on the scale factor value output by the first scale factor calculator 450. After this process, the level of received signals becomes constant in the first received section.

In addition, the first input signal converter 470 applies the scale factor value, which has been output by the first sale factor calculator 450, to a value output by the repeated section detector 410 so that the standard deviation is calculated with regard to a limited section of received signals and then applied to all received signals.

The second input signal converter 480 conducts scaling with regard to the second repeated section based on the scale factor value output by the second scale factor calculator 460. After this process, the level of received signals becomes constant in the second received section.

In addition, the second input signal converter 480 applies the scale factor value, which has been output by the second sale factor calculator 460, to a value output by the repeated section detector 410 so that the standard deviation is calculated with regard to a limited section of received signals and is then applied to all received signals.

The parallel/serial converter 490 aligns the scaled signals, which have been output by the first and second input signal converters 470 and 480, into a sequence and transmits it to the decoder.

Figure 5:
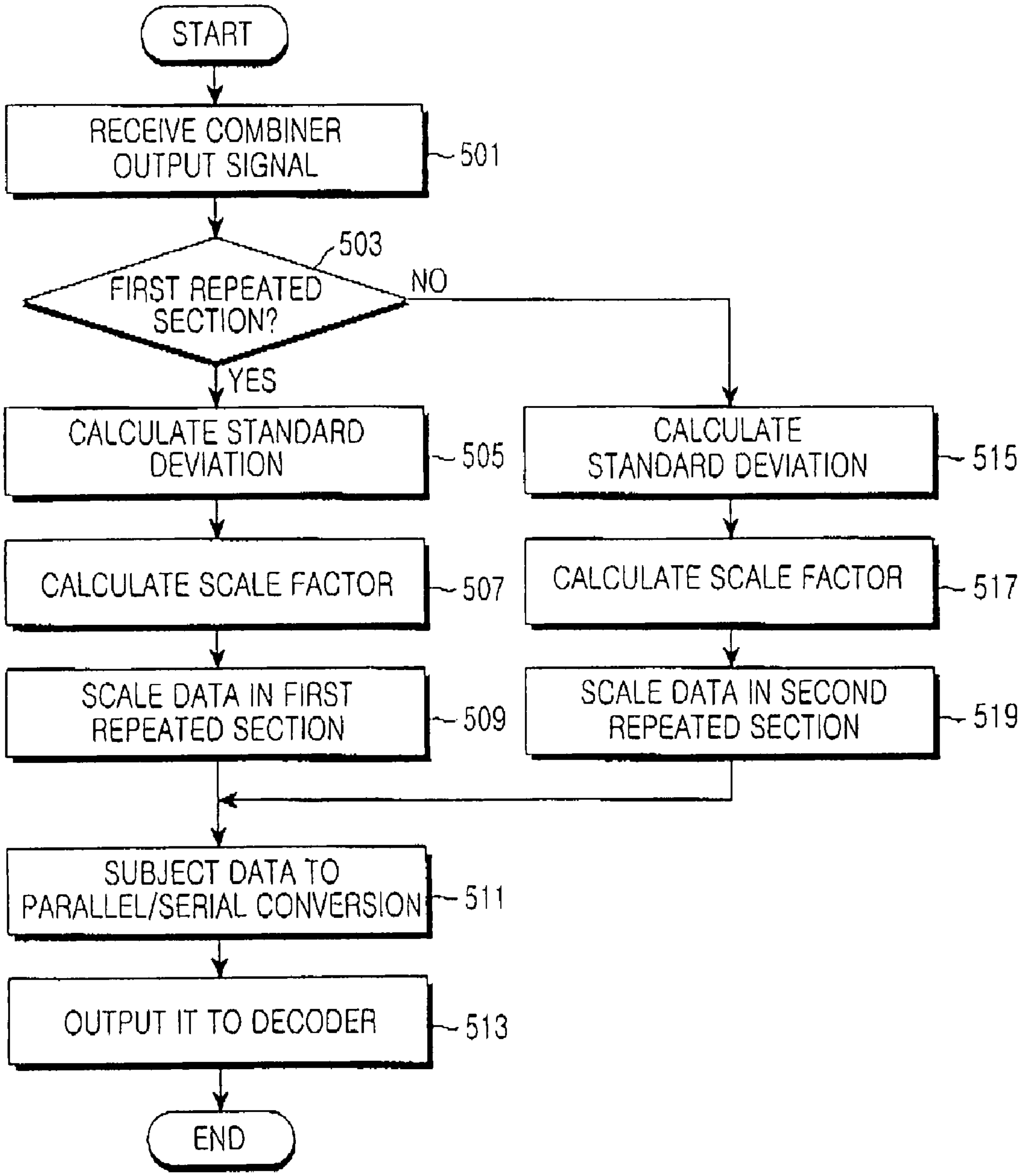
FIG. 5 is a flowchart showing a method for quantization in a digital communication system according to an embodiment of the present invention.

FIG. 5 is a flowchart showing a method for quantization in a digital communication system according to an embodiment of the present invention. Particularly, FIG. 5 shows the operation of the dynamic quantizer shown in FIG. 3. The quantization method includes a quantization level creation process, in which the dynamic range of received packet data is measured to calculate a corresponding scale factor, and an input signal conversion process, in which the received data signal is scaled according to the scale factor so as to create quantized signals.

Referring to FIG. 5, the repeated section detector 310 of the dynamic quantizer 240 receives signals output by the combiner 230 in step 501. The repeated section detector 310 detects first and second repeated sections from the signals received from the combiner 230 according to the number of times a packet codeword is repeated in step 503. In this case, packet information is input to the repeated section detector 310.

If data in a section repeated n times is detected, the first standard deviation calculator 320 calculates the standard deviation of data in the first repeated section in step 505. Based on the calculated standard deviation, the dynamic range of received packet signals is calculated.

After the standard deviation is calculated, the first scale factor calculator 350 multiplies the standard deviation, which has been calculated by the first standard deviation calculator 320, by an input scale factor; divides the product by $2^{effective\ bit\ number}$ so as to calculate the scale factor of the first repeated section; and outputs the calculated scale factor to the first input signal converter 370 in step 507.

Based on the scale factor value calculated by the first scale factor calculator 350, the first input signal converter 370 scales the first repeated section in step 509. After this process, the level of received signals becomes constant in the first repeated section.

The resulting value may be applied to a value output by the repeated section detector 310 so as to measure the standard deviation with regard to a limited section of received signals and apply the measured standard deviation to all received signals.

The parallel/serial converter 390 aligns the scaled signals, which have been output by the first input signal converter 370, into a sequence in step 511, and transmits it to the decoder in step 513.

If the repeated section detector 310 has detected a section repeated n−1 times in step 503, the second standard deviation calculator 340 calculates the standard deviation of data in the second repeated section in step 515 so as to measure the dynamic range of received packet signals.

After the standard deviation is calculated, the second scale factor calculator 360 multiplies the standard deviation, which has been calculated by the second standard deviation calculator 340, by an input scale factor; divides the product by $2^{effective\ bit\ number}$ so as to calculate the scale factor of the second repeated section; and outputs the calculated scale factor to the second input signal converter 380 in step 517.

Based on the scale factor value calculated by the second scale factor calculator 360, the second input signal converter 380 scales the second repeated section in step 519. After this process, the level of received signals becomes constant in the second repeated section.

The resulting value may be applied to a value output by the repeated section detector 310 so as to measure the standard deviation with regard to a limited section of received signals and apply the measured standard deviation to all received signals.

After step 519, the parallel/serial converter 390 aligns the scaled signals, which have been output by the second input signal converter 380, into a sequence in step 511, and transmits it to the decoder in step 513.

Figure 6:
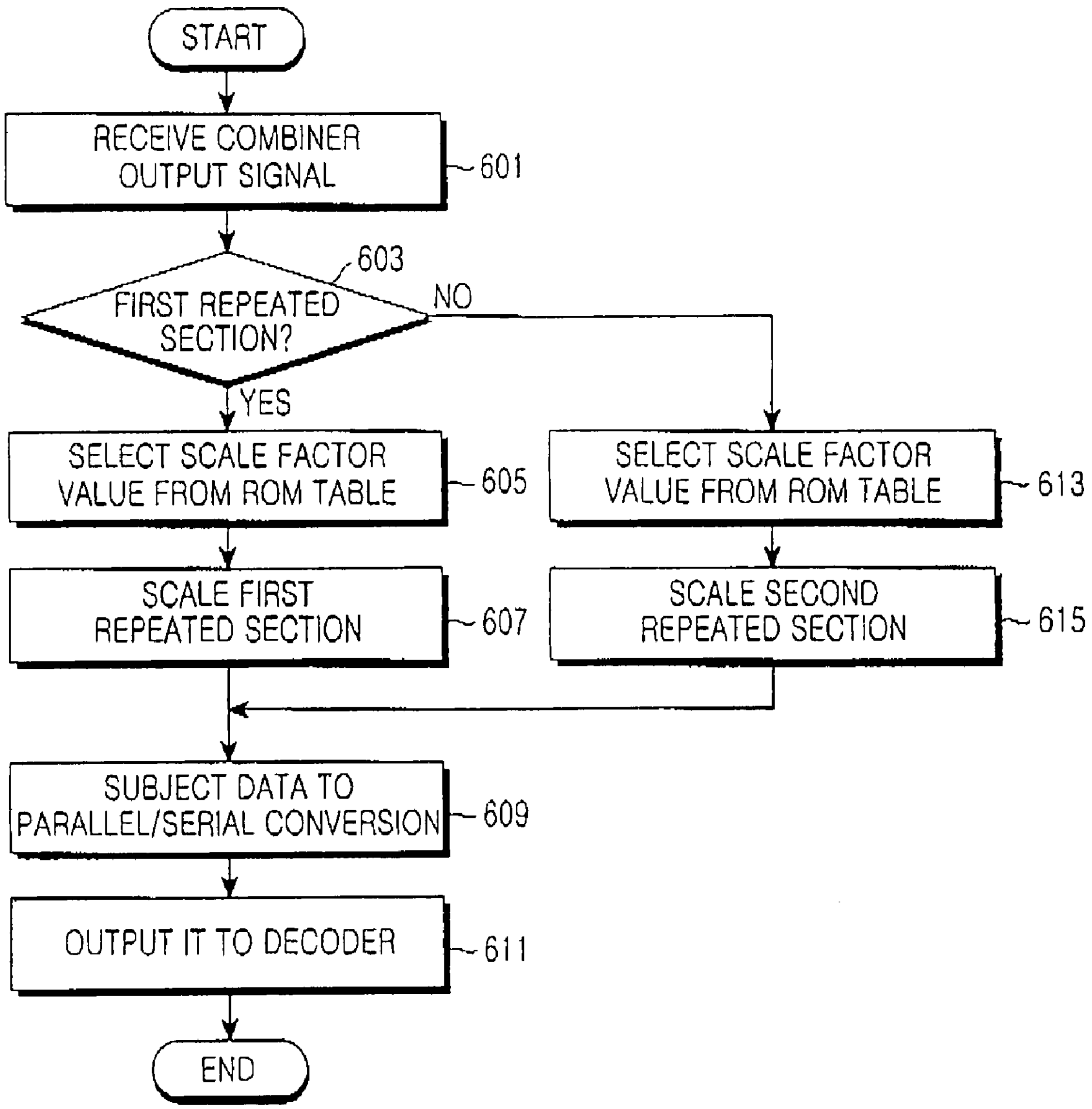
FIG. 6 is a flowchart showing a method for quantization in a digital communication system according to another embodiment of the present invention.

FIG. 6 is a flowchart showing a method for quantization in a digital communication system according to another embodiment of the present invention. Particularly, FIG. 6 shows the operation of the dynamic quantizer shown in FIG. 4.

Referring to FIG. 6, the repeated section detector 410 of the dynamic quantizer 240 receives signals output by the combiner in step 601. The repeated section detector 410 detects first and second repeated sections from the signals received from the combiner 230 according to the number of times a packet codeword is repeated in step 603. In this case, packet information is input to the repeated section detector 410.

If data in a repeated section is detected, the first scale factor calculator 450 selects the standard deviation of data in the first repeated section, which has been stored in the ROM table; multiplies the selected standard deviation by an input scale factor so as to calculates the scale factor of the first repeated section; and outputs the calculated scale factor to the first input signal converter 370 in step 605.

Based on the scale factor value calculated by the first scale factor calculator 450, the first input signal converter 470 scales the first repeated section in step 607. After this process, the level of received signals becomes constant in the first repeated section.

The resulting value may be applied to a value output by the repeated section detector 410 so as to measure the standard deviation with regard to a limited section of received signals and apply the measured standard deviation to all received signals.

The parallel/serial converter 490 aligns the scaled signals, which have been output by the first input signal converter 470, into a sequence in step 609, and transmits it to the decoder in step 611.

If the repeated section detector 410 has received signals output by the combiner 230 and detected first and second repeated sections from the signals according to the number of times a packet codeword is repeated in step 603, the repeated section detector 410 measures the dynamic range of the received packet signals with reference to the ROM table. The second scale factor calculator 460 selects the standard deviation of data in the first repeated section, which has been stored in the ROM table; multiplies the selected standard deviation by an input scale factor so as to calculate the scale factor of the first repeated section; and outputs the calculated scale factor to the second input signal converter 480 in step 613.

Based on the scale factor value calculated by the second scale factor calculator 460, the second input signal converter 480 scales the second repeated section so as to create quantized signals in step 615. After this process, the level of received signals becomes constant in the second repeated section.

The resulting value may be applied to a value output by the repeated section detector 410 so as to measure the standard deviation with regard to a limited section of received signals and apply the measured standard deviation to all received signals.

The parallel/serial converter 490 aligns the scaled signals, which have been output by the second input signal converter 480, into a sequence in step 609, and transmits it to the decoder in step 611.

Figure 7:
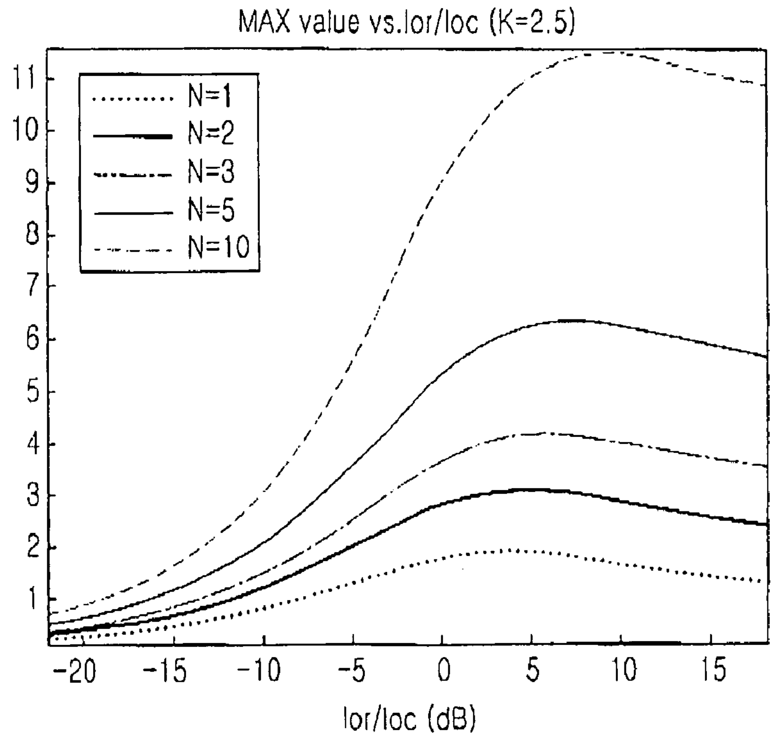
FIG. 7 shows the change of dynamic range as a function of the number of times a codeword of a received packet is repeated according to an embodiment of the present invention.

FIG. 7 shows the change of dynamic range as a function of the number of times a codeword of a received packet is repeated according to an embodiment of the present invention.

The change of dynamic range can be predicted based on the number of times a codeword of a received packet is repeated. If an Additive White Gaussian Noise (AWGN) 1-Path environment is assumed, for example, the dynamic range of received signals varies according to the number of times a codeword is repeated in the following manner.

Assuming $I_{or}+I_{oc}$=A dB, and $I_{or}/I_{oc}$=B dB with regard to output signals based on AGC (Automatic Gain Control), $I_{or}$ and $I_{oc}$ can be defined by Equations (1) and (2) below, respectively.

$$I_{or} = \frac{A}{1+10^{-0.1B}} \quad (1)$$

$$I_{oc} = \frac{A \cdot 10^{-0.1B}}{1+10^{-0.1B}} \quad (2)$$

The amplitude of the pilot weight signal component is defined by Equation (3) below.

$$\frac{A}{1+10^{-0.1B}} \quad (3)$$

The standard deviation of the pilot weight noise component is defined by Equation (4) below.

$$\frac{A \cdot 10^{-0.05B}}{1+10^{-0.1B}} \quad (4)$$

When the number of times a codeword is repeated is N, noise components K and σ can be expressed as defined by Equation (5) below.

$$\frac{A \cdot \left(N + \sqrt{N} \cdot K \cdot 10^{-0.05B}\right)}{1+10^{-0.1B}} \quad (5)$$

Assuming that A=1 and K=2.5, the maximum value received signals can have is shown in FIG. 7. When an 8-bit quantizer is used, for example, the value can be expressed as −128~+127. If a step size is 0.04, the actual dynamic range is expressed as −5.12~+5.08. Although FIG. 7 gives expressions up to N=3, saturation occurs if N>4. This means that received signals must undergo a suitable normalization process. The scale factor coefficient, i.e. the input value to the quantizer 240 shown in FIGS. 3 and 4, corresponds to K in Equation (5).

If an HRPD system has a DRC value of 1 as an example of Equation (5), the number of transmission slots of a single packet is 16, and the maximum number of times a codeword is repeated is 9.6. The number of data bits of a packet is 5,120; and 3,200 bits are transmitted per each slot, except that, in the case of the first slot, via which the preamble is transmitted, only 1,152 bits are transmitted. Therefore, it can be said that, when data is received via each slot, not all codewords are repeated the same number of times. Particularly, a group of codewords are repeated n times, and another group of codewords are repeated n−1 times. The number of times codewords are repeated for each received slot is as follows.

2 slots: 4,352 bits received 3 slots: 7,552 bits received (preceding 2,432 bits are repeated once, and remaining 2,688 bits are not repeated)

4 slots: 10,752 bits received (preceding 512 bits are repeated 3 times, and remaining 4,608 bits are repeated twice)

16 slots: 49,152 bits received (preceding 3,072 bits are repeated 10 times, and remaining 204 bits are repeated 9 times).

Figure 8:
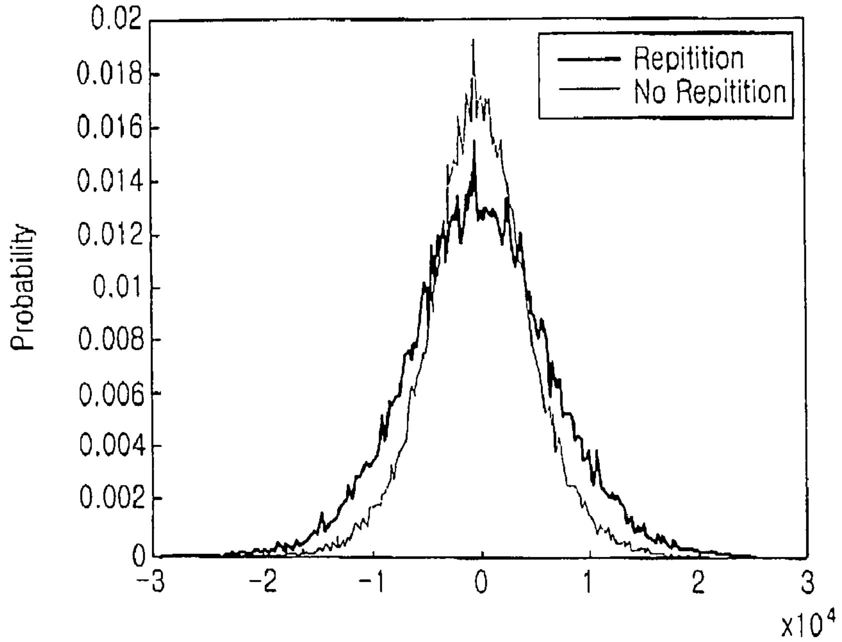
FIG. 8 shows an exemplary distribution of combiner output signals with regard to a section in which a codeword is repeated once and another section in which no codeword is repeated in a digital communication system according to an embodiment of the present invention.

FIG. 8 shows an exemplary distribution of combiner output signals with regard to a first section in which a codeword is repeated and a second section in which no codeword is repeated in a digital communication system according to an embodiment of the present invention.

Particularly, FIG. 8 shows the distribution of received signals in a section having a codeword repeated once, as well as in a section having no codeword repeated, when the third slot has been received with regard to a packet having a DRC value of 1 in an HRPD system.

It is clear from FIG. 8 that signals in the once-repeated section are more widely spread than those in the non-repeated section. This means that, assuming the same number of effective bits, the quantization interval must be larger in the repeated section than in the non-repeated section.

Figure 9:
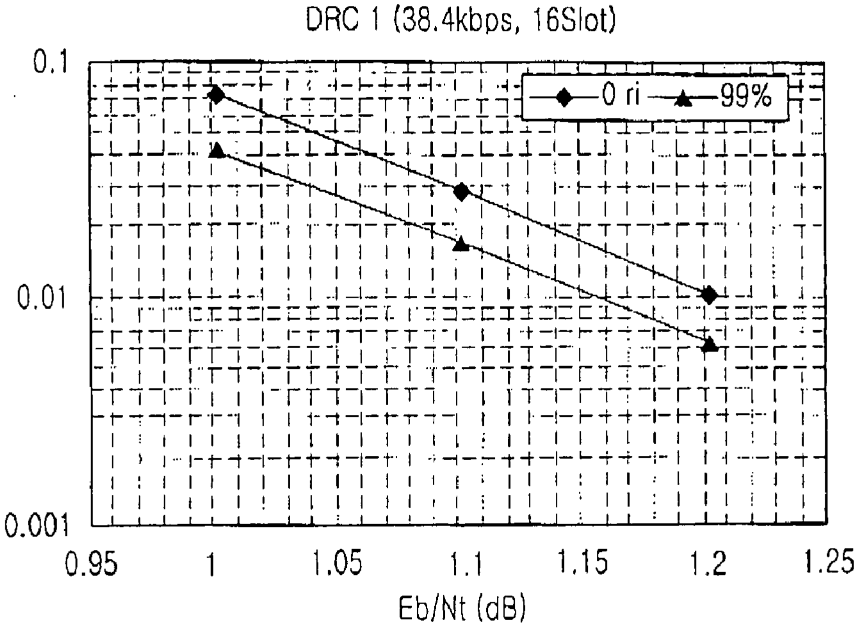
FIG. 9 shows an example of performance improvement in an AWGN environment according to an embodiment of the present invention.

FIG. 9 shows an example of performance improvement in an AWGN environment according to an embodiment of the present invention.

Particularly, FIG. 9 shows the performance comparison between an 8-bit turbo decoder according to the prior art and an 8-bit turbo decoder according to the present invention when the DRC value is 1 in an AWGN environment. It is clear from FIG. 9 that, even when the same decoder is used, the present invention has improved the performance.

Figure 10:
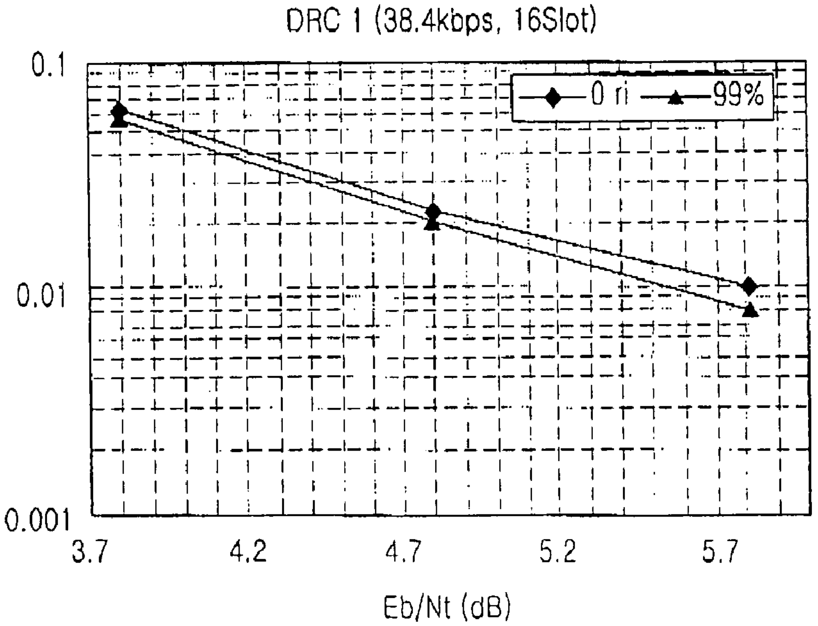
FIG. 10 shows an example of performance improvement in a fading environment according to an embodiment of the present invention.

FIG. 10 shows an example of performance improvement in a fading environment according to an embodiment of the present invention.

FIG. 10 has the same conditions as FIG. 9, except for the fading environment, in which the dynamic range of received signals varies more greatly than in the AWGN environment. As a result, the improvement in performance by the present invention becomes clearer.

The merits and effects of the present invention, and as so configured to operate above, will be described as follows.

As described above, the present invention is advantageous in that, by measuring the signal range of demodulated data and actively adjusting the quantization interval based on the measurement in a digital communication system, the quantization is optimized.

In addition, decoder input signals are quantized optimally and actively regardless of the demodulation type, the number of times a packet codeword is repeated, and the varying wireless channel.

The performance of a receiver is improved without increasing the number of effective bits input to a decoder.

The present invention also improves the signal-receiving performance of a decoder without modifying it.

Furthermore, the dynamic range of signals input to a decoder can be actively adjusted without modifying it.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for adjusting a dynamic range of a decoder input signal in a digital communication system, the apparatus comprising:

a quantization level generator for measuring a dynamic range according to a packet repetition number of received packet data and calculating a scale factor according to the packet repetition number and a prepared scale factor coefficient; and an input signal converter for scaling the packet data according to the calculated scale factor so as to output a quantized signal.

2. The apparatus as claimed in claim 1, wherein the quantization level generator detects a standard deviation of the packet data from a ROM table stored standard deviation according to the packet repetition number, calculates and outputs the scale factor by using the detected standard deviation and the scale factor coefficient.

3. The apparatus as claimed in claim 1, wherein the quantization level generator comprises:

a repeated section detector for detecting and outputting first and second repeated sections from the packet data according to a packet codeword repetition number within packet information input from an outside;

a first standard deviation calculator for calculating a standard deviation of the packet data in the first repeated section so as to measure a dynamic range of the packet data;

a second standard deviation calculator for calculating a standard deviation of the packet data in the second repeated section so as to measure a dynamic range of the packet data;

a first scale factor calculator for multiplying the standard deviation outputted from the first standard deviation calculator by the scale factor coefficient and dividing a resulting product by 2^ effective bit number so as to calculate and output a scale factor; and a second scale factor calculator for multiplying the standard deviation output from the second standard deviation calculator by an inputted scale factor coefficient and dividing a resulting product by 2^ effective bit number so as to calculate and output a scale factor.

4. The apparatus as claimed in claim 3, wherein the input signal converter comprises:

a first input signal converter for scaling the first repeated section by using a scale factor value calculated by the first scale factor calculator;

a second input signal converter for scaling the second repeated section by using a scale factor value calculated by the second scale factor calculator; and a parallel/serial converter for aligning scaled signals output by the first and second input signal converters into a sequence and transmitting the sequence.

5. The apparatus as claimed in claim 3, wherein the repeated section detector is adapted to detect two sections having different codeword repetition numbers from the packet data by using a data rate control value and a received slot number.

6. The apparatus as claimed in claim 3, wherein the packet information comprises a total number of transmitted slots for the packet data, a codeword bit number, and modulation order.

7. The apparatus as claimed in claim 3, wherein the first and the second standard deviation calculator is adapted to calculate a standard deviation with regard to all the packet data.

8. The apparatus as claimed in claim 3, wherein the first and the second standard deviation calculator is adapted to calculate a standard deviation with regard to a limited section of the packet data and apply the calculated standard deviation to all the packet data.

9. The apparatus as claimed in claim 1, wherein the quantization level generator comprises:

a repeated section detector for detecting a repeated section from the packet data according to a packet codeword repetition number and outputting the repeated section;

a standard deviation calculator for calculating the standard deviation of the packet data so as to measure a dynamic range of the received packet signal; and a scale factor calculator for multiplying the standard deviation output from the standard deviation calculator by the scale factor coefficient and dividing a resulting product by 2^ effective bit number so as to calculate and output the scale factor.

10. The apparatus as claimed in claim 2, wherein the quantization level generator comprises:

a repeated section detector for detecting a repeated section from the packet data according to a packet codeword repetition number and outputting the repeated section; and a scale factor calculator for multiplying a standard deviation retrieved from the ROM table by an input scale factor coefficient and dividing a resulting product by 2^ effective bit number so as to calculate and output the scale factor.

11. The apparatus as claimed in claim 2, wherein the quantization level generator comprises:

a repeated section detector for detecting and outputting first and second repeated sections from the packet data according to a packet codeword repetition number within packet information output from an outside;

a first scale factor calculator for multiplying a standard deviation retrieved from a ROM table by the scale factor coefficient according to the first repeated section and dividing a resulting product by 2^ effective bit number so as to calculate and output a scale factor; and a second scale factor calculator for multiplying a standard deviation retrieved from the ROM table by the scale factor coefficient according to the second repeated section and dividing a resulting product by 2^effective bit number so as to calculate and output a scale factor.

12. The apparatus as claimed in claim 11, wherein the input signal converter comprises:

a first input signal converter for scaling the first repeated section by using a scale factor value calculated by the first scale factor calculator;

a second input signal converter for scaling the second repeated section by using a scale factor value calculated by the second scale factor calculator; and a parallel/serial converter for aligning scaled signals output by the first and second input signal converters into a sequence and transmitting the sequence.

13. A method for adjusting a dynamic range of a decoder input signal in a digital communication system, the method comprising the steps of:

(a) creating a quantization level by measuring a dynamic range according to a packet repetition number of received packet data and calculating a scale factor according to the packet repetition number and a prepared scale factor coefficient; and (b) converting an input signal by scaling the packet data according to the calculated scale factor by creating a quantized signal.

14. The method as claimed in claim 13, wherein step (a) comprises:

detecting a standard deviation of the packet data from a ROM table stored standard deviation according to the packet repetition number;

calculating the scale factor by using the detected standard deviation and the scale factor coefficient.

15. The method as claimed in claim 13, wherein step (a) comprises:

detecting a repeated section from the packet data according to a packet codeword repetition number within packet information input from an outside;

calculating a standard deviation of packet data so as to measure a dynamic range of the packet data;

multiplying the calculated standard deviation by the scale factor coefficient and dividing a resulting product by 2^ effective bit number so as to calculate the scale factor value; and scaling the repeated section by using the calculated scale factor value.

16. The method as claimed in claim 13, wherein step (a) comprises:

detecting first and second repeated sections from the packet data according to a packet codeword repetition number within packet information input from an outside;

selectively calculating a standard deviation of data in the first or second repeated section according to a repeated section detection result so as to measure a dynamic range of a received packet signal; and multiplying the standard deviation by the scale factor coefficient and dividing a resulting product by 2^ effective bit number so as to calculate a scale factor value, and step (b) comprises:

scaling the first or second repeated section with regard to the packet data by using the calculated scale factor value; and aligning the scaled signal into a sequence and transmitting the sequence.

17. The method as claimed in claim 16, wherein, in the step of detecting first and second repeated sections, the first and second repeated sections having different codeword repetition numbers are detected from the packet data by using a data rate control value and a received slot number.

18. The method as claimed in claim 16, wherein the packet information comprises a total number of transmitted slots for a packet, a codeword bit number, and modulation order.

19. The method as claimed in claim 16, wherein, in the step of selectively calculating a standard deviation, the standard deviation is calculated with regard to all packet data.

20. The method as claimed in claim 16, wherein, in the step of selectively calculating a standard deviation, the standard deviation is calculated with regard to a limited section of the packet data and is applied to all packet data.

* * * * *